US012755122B2

(12) United States Patent
Coleman

(10) Patent No.: US 12,755,122 B2
(45) **Date of Patent: *Oct. 6, 2026**

(54) ILLUMINATING TRANSACTION CARD

(71) Applicant: American Express Travel Related Services Company, Inc., New York, NY (US)

(72) Inventor: James Bruce Coleman, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/312,531

(22) Filed: Aug. 28, 2025

(65) Prior Publication Data

US 2025/0390696 A1 Dec. 25, 2025

Related U.S. Application Data

(63) Continuation of application No. 18/624,351, filed on Apr. 2, 2024, now Pat. No. 12,437,177, which is a (Continued)

(51) Int. Cl.
*G06K 19/07* (2006.01)
*G06K 19/077* (2006.01)

(52) U.S. Cl.
CPC ... *G06K 19/0723* (2013.01); *G06K 19/07773* (2013.01)

(58) Field of Classification Search
None
See application file for complete search history.

(56) References Cited

U.S. PATENT DOCUMENTS

| | | | |
|---|---|---|---|
| 8,413,894 | B2 | 4/2013 | Bona et al. |
| 9,230,255 | B1 | 1/2016 | Hanmer |

(Continued)

FOREIGN PATENT DOCUMENTS

| | | | |
|---|---|---|---|
| CN | 202632327 | U | 12/2012 |
| JP | 2010-182098 | A | 8/2010 |

(Continued)

OTHER PUBLICATIONS

First Office Action in JP Patent Application No. 2024527231 mailed on Jul. 28, 2025.

(Continued)

*Primary Examiner* — Kristy A Haupt
(74) *Attorney, Agent, or Firm* — Thomas Horstemeyer LLP.

(57) ABSTRACT

A transaction card is described that includes a first layer, a second layer, a loop antenna, an inductive illumination antenna, and a light-emitting element. At least a one of the first layer and the second layer has a transparent planar portion through which light transmits. The loop antenna is inset between the first layer and the second layer. The light-emitting element has a first terminal and a second terminal. The inductive illumination antenna is inset between the first layer and the second layer and positioned proximate to the loop antenna such that, when the transaction card is positioned in a magnetic field, the inductive illumination antenna is induced with a current from the loop antenna. The inductive illumination antenna is connected to the first terminal and the second terminal.

20 Claims, 10 Drawing Sheets

Related U.S. Application Data continuation of application No. 17/565,542, filed on Dec. 30, 2021, now Pat. No. 11,989,603.

(56) References Cited

U.S. PATENT DOCUMENTS

| | | | |
|---|---|---|---|
| D816,160 | S | 4/2018 | Sippola et al. |
| D836,162 | S | 12/2018 | Sippola et al. |
| 12,437,177 | B2 * | 10/2025 | Coleman ............ G06K 19/0723 |
| 2009/0250517 | A1 | 10/2009 | Brandin et al. |
| 2011/0037607 | A1 | 2/2011 | Vere et al. |
| 2016/0004947 | A1 | 1/2016 | Pueschner et al. |
| 2019/0272456 | A1 | 9/2019 | Roach et al. |
| 2020/0160135 | A1 | 5/2020 | Lowe |
| 2023/0252259 | A1 | 8/2023 | Lowe et al. |

FOREIGN PATENT DOCUMENTS

| | | | |
|---|---|---|---|
| JP | 2017-220084 | A | 12/2017 |
| JP | 2021-106136 | A | 7/2021 |
| KR | 101016847 | B1 | 2/2011 |
| KR | 20110030269 | A | 3/2011 |
| KR | 10-2014-0115826 | A | 10/2014 |

OTHER PUBLICATIONS

Notice to Submit Response in KR App. No. 10-2024-7022041 mailed Mar. 24, 2025.

Taylor Lyles, "Of course Razer made a light-up prepaid credit card," TL; DR (Oct. 6, 2020) (last visited: Dec. 14, 2021 ).

Extended European Search Report dated Nov. 19, 2025 for European Application No. 22917467.7.

* cited by examiner

ILLUMINATING TRANSACTION CARD

CROSS-REFERENCE TO RELATED APPLICATIONS

This application is a continuation of and claims the benefit of and priority to U.S. patent application Ser. No. 18/624,351 filed on Apr. 2, 2024, entitled "ILLUMINATING TRANSACTION CARD," which is a continuation of and claims the benefit of and priority to U.S. patent application Ser. No. 17/565,542 filed on Dec. 30, 2021, entitled "ILLUMINATING TRANSACTION CARD," the contents of which are incorporated by reference in their entirety herein.

BACKGROUND

Transaction cards are used for payments in a wide variety of situations. For transaction accounts targeting various consumer markets, such as technology-focused and luxury markets, companies may offer transaction cards having non-traditional designs. However, non-traditional designs are limited as transaction cards have various constraints, such as size restrictions, magnetic strip positioning limitations, standards requirements, etc., such that the transaction cards are capable of being utilized using widely-available and standard reader devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for creating an illuminating transaction card. In some approaches, a transaction card includes a first print layer and a second print layer. At least one of the first print layer and the second print layer includes a transparent or translucent portion through which light is able to transmit. The transaction card further includes an antenna inlay layer having one or more antennae disposed thereon. In some embodiments, the antennae include a loop antenna. A light-emitting element is disposed or otherwise positioned between the antenna inlay layer and one of the first print layer and the second print layer, such that the light-emitting element is positioned proximate to the transparent portion.

The transaction card further includes wireless power receiver circuitry coupled to the light-emitting element and the loop antenna. In some approaches, the wireless power circuitry is configured to receive a wireless signal via the loop antenna and induce a voltage across terminals of the light-emitting element, thereby causing the light-emitting element to illuminate and light to emit through the transparent portion. The wireless signal can be an oscillating magnetic field emitted by a transaction card reader device or similar wireless signal.

In accordance with various approaches, the light-emitting element is a single light-emitting diode (LED), a plurality of light-emitting diodes (LEDs), an organic light-emitting diode (OLED) panel, a printed dispersion of LEDs, or any combination thereof. In some examples, the light-emitting element is one or more printed micro light-emitting diode (microLED) regions. Moreover, the light-emitting element can have a two-dimensional form factor, as will be described.

In the following discussion, a general description of an illuminating transaction card and a method for manufacturing the same is provided. Although the following discussion provides illustrative examples of the various embodiments of the present disclosure, the use of the following illustrative examples does not exclude other implementations that are consistent with the principals disclosed.

Figure 1:
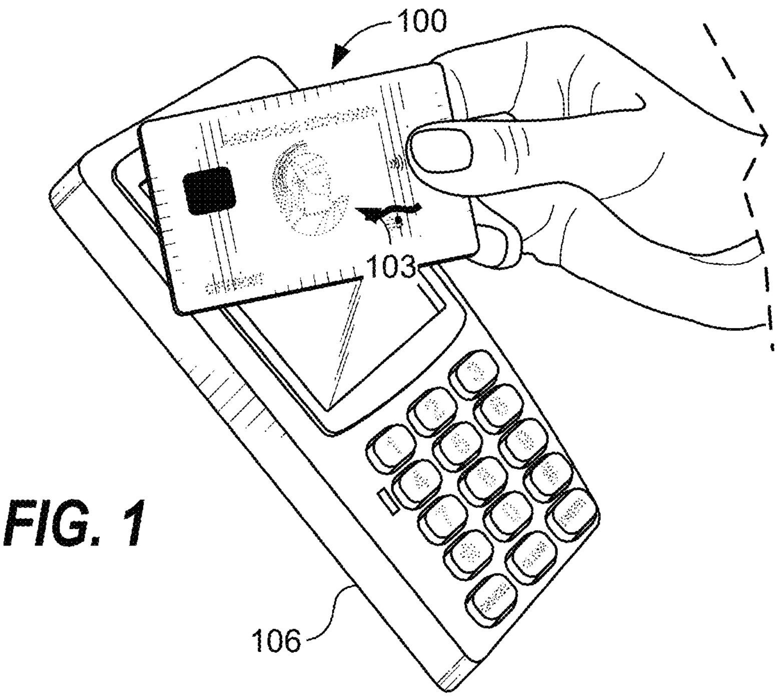
FIG. 1 depicts an example of a transaction card in a non-illuminated state according to various embodiments of the present disclosure.
Figure 2:
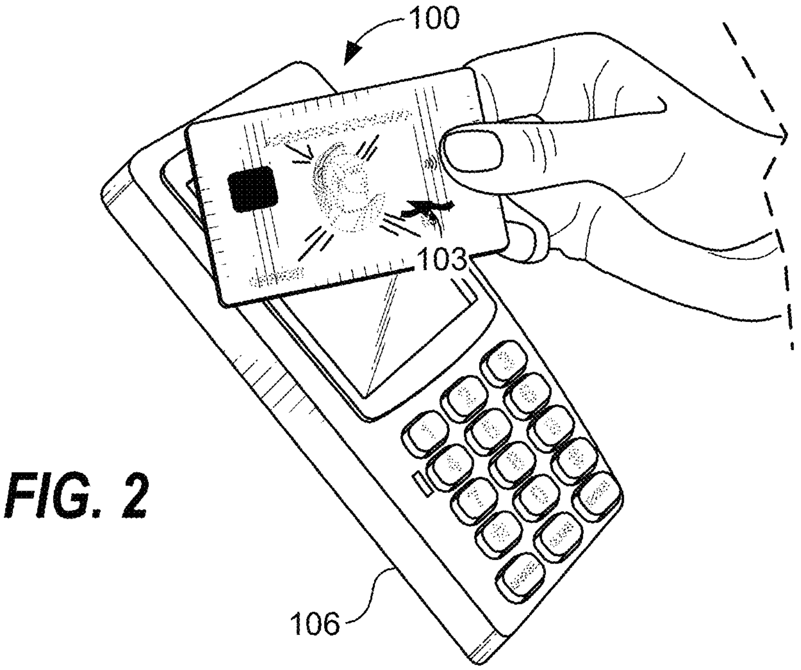
FIG. 2 depicts an example of a transaction card in an illuminated state according to various embodiments of the present disclosure.

FIGS. 1 and 2 depict an example of a transaction card 100 that is assembled according to various embodiments of the present disclosure. The transaction card 100 can include an illuminating region 103 that illuminates when the transaction card 100 receives a sufficient wireless signal capable of powering one or more light-emitting elements of the transaction card 100, which is referred to herein in the singular as a light-emitting element for explanatory purposes.

Notably, FIG. 1 shows the transaction card 100 in a non-illuminated state, and FIG. 2 shows the transaction card 100 in an illuminated state. In some examples, when the transaction card 100 is placed proximate to a reader device 106, the reader device 106 can emit a wireless power signal sufficient to illuminate the light-emitting diode. For instance, the reader device 106 can generate an oscillating magnetic field. The reader device 106 can include a contactless payment terminal, for example.

As such, it is understood that the wireless power signal can be emitted via near-field communication (NFC) and/or radio-frequency identification (RFID) technologies. In additional approaches, when the transaction card 100 is placed relative to a smartphone or other electrical device having a wireless power transmitter, or is placed in a wireless power region created by a wireless power transmitter, the transaction card 100 can receive a wireless power signal sufficient to cause the light-emitting element to illuminate and perform other transaction-related functions.

Figure 3:
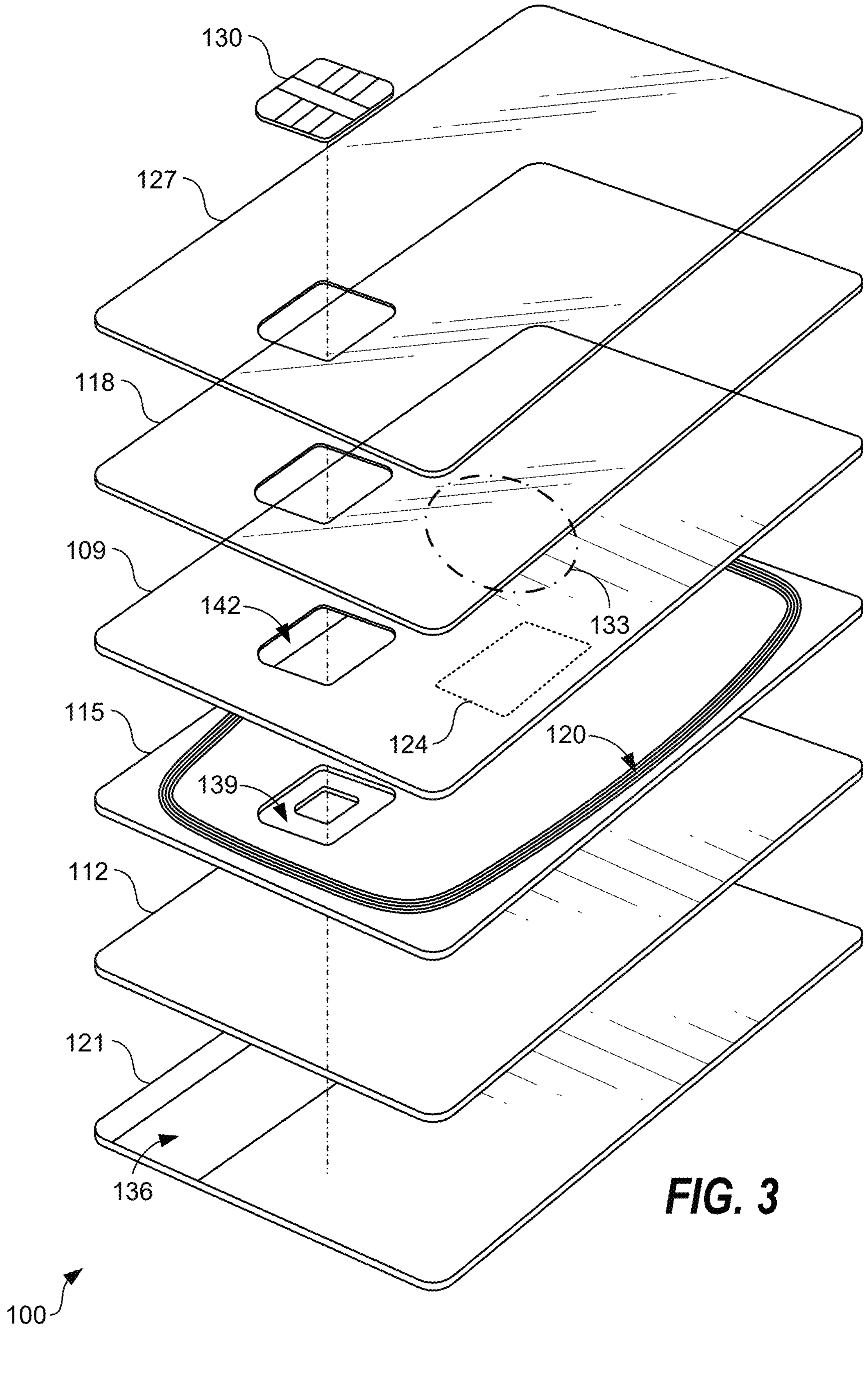
FIG. 3 depicts an exploded view of one example arrangement of the transaction card.

FIG. 3 depicts an exploded view of one example arrangement of the transaction card 100. Generally, the transaction card 100 can include a first print layer 109, a second print layer 112, an antenna inlay layer 115, a first laminate overlay layer 118, and a second laminate overlay layer 121, and a light-emitting element 124. The light-emitting element 124 can include one or more light-emitting elements 124 as can be appreciated, where the one or more light-emitting elements 124 are referred to herein in the singular as a light-emitting element 124 for explanatory purposes. In some approaches, the transaction card 100 further includes a post-laminate varnish layer 127 and a processing chip 130. The post-laminate varnish layer 127, the first laminate overlay layer 118, and/or the second laminate overlay layer 121 can be transparent or translucent.

The first print layer 109 and the second print layer 112 can be formed by printing or otherwise disposing ink or other colored item on the layer, thereby creating a transaction card 100 having a certain appearance. At least one of the first print layer 109 and the second print layer 112 can include one or more transparent portions 133 through which light transmits, where the one or more transparent portions 133 are referred to herein in the singular as a transparent portion 133 for explanatory purposes. The transparent portion 133 can include an area in which no ink has been printed or an area in which ink has been thinly or otherwise applied, such that light is able to transmit through the transparent portion 133. In some approaches, the transparent portion 133 is formed of a material different than remaining portions of the respective layer. It is understood that portions of the first print layer 109 and/or the second print layer 112 that are not transparent can be opaque. The combination of the opaque and transparent qualities can be configured to create a transaction card 100 having a desired aesthetic appearance.

While the transparent portion 133 is shown in FIG. 3 as being on the first print layer 109, it is understood that a transparent portion 133 can also be positioned on the second print layer 112. In some approaches, the transparent portion 133 can be positioned only on the second print layer 112. Further, FIG. 3 shows the transparent portion 133 as having an ovular shape. It is understood, however, that the transparent portion 133 can be circular, square, rectangular shaped, or can be shaped to form numbers, letters, ribbons, banners, and so forth.

The antenna inlay layer 115 can include various antennae disposed thereon, such as a loop antenna 120, or other suitable type of antenna. To facilitate providing a transaction card 100 having a small thickness, the antennae, such as the loop antenna 120, can have a two-dimensional form factor. To this end, the loop antenna 120 or other antennae can be provided when copper or other conductive material is arranged in a coil having one or more windings disposed at or near an edge of the antenna inlay layer 115 within a substrate. The loop antenna 120 can be nested in the substrate such that the substrate has a generally flat surface. Depending on the desired properties of the first print layer 109 and the second print layer 112, it is understood that the loop antenna 120 may or may not be visible when the transaction card 100 is assembled.

According to various approaches, the light-emitting element 124 can have a two-dimensional form factor, and can be positioned between the antenna inlay layer 115 and one of the first print layer 109 and the second print layer 112. Additionally, the light-emitting element 124 can be positioned proximate to the transparent portion 133. While the light-emitting element 124 can be a separate component from the first print layer 109, the second print layer 112, and the antenna inlay layer 115, in some embodiments, the light-emitting element 124 can be formed integral with a respective side of one of the layers such that the light-emitting element 124 is positioned proximate the transparent portion 133. In various embodiments, the light-emitting element 124 has a two-dimensional form factor, thereby permitting the transaction card 100 to have or satisfy International Organization for Standardization (ISO) standards associated with transaction cards. For instance, the transaction card 100 can be approximately 85.6 millimeters in width, 53.98 mm in height, and 0.76 mm in thickness.

The second laminate overlay layer 121 can include a magnetic stripe 136. The magnetic stripe 136 can include any band of magnetic material capable of storing data. Data stored on the magnetic stripe 136 can include various information, such as an account number of a payment account associated with the transaction card 100, the expiration date of the payment account, a card verification value (CVV) or card verification code (CSC), a service code, etc.

The transaction card 100 can further include wireless power receiver circuitry (not shown) that can be coupled to the light-emitting element 124 and the loop antenna 120. The wireless power receiver circuitry can be configured to receive a wireless signal via the loop antenna 120 and induce a voltage across terminals of the light-emitting element 124, thereby causing the light-emitting element 124 to illuminate such that light emits through the transparent portion 133.

The processing chip 130 is shown as being placed within a pocket 139 on the exterior surface of the antenna inlay layer 115. In some approaches, the processing chip 130 can be secured within the pocket 139 using a suitable adhesive. Additionally, in some approaches, and as shown in FIG. 3, the post-laminate varnish layer 127, the first laminate overlay layer 118, and/or the first print layer 109 can include windows 142 having a size and shape similar to the processing chip 130, such that a top surface of the processing chip 130 can be positioned through the windows and be flush or nearly flush with a top surface of the post-laminate varnish layer 127 when the transaction card 100 is fully assembled.

Further, the loop antenna 120 can be used to provide wireless communications between the processing chip 130 and a contactless payment terminal or other reader device 106. The loop antenna 120 can also be used to provide power to the processing chip 130 via a wireless signal received from the payment terminal. In some approaches, the loop antenna 120 can be physically coupled to the processing chip 130, while in other implementations, the loop antenna 120 can be inductively coupled to the processing chip 130. Although depicted separately from the processing chip 130, in some implementations the loop antenna 120, or a portion thereof, can be included in or integrated within the processing chip 130.

The processing chip 130 can represent any integrated circuit chip that can be used for securing or processing payments using the transaction card 100. Examples of processing chips 130 include integrated circuit chips that implement various versions of the Europay, Mastercard, and VISA (EMV) standard for smart payment cards. In some implementations, the processing chip 130 is coupled to the loop antenna 120 to provide contactless payment using near-field communication (NFC), ultrawide band (UWB) or similar low-power, short-range wireless communications standards. However, in other implementations, the processing chip 130 can include an integrated antenna.

Figure 4:
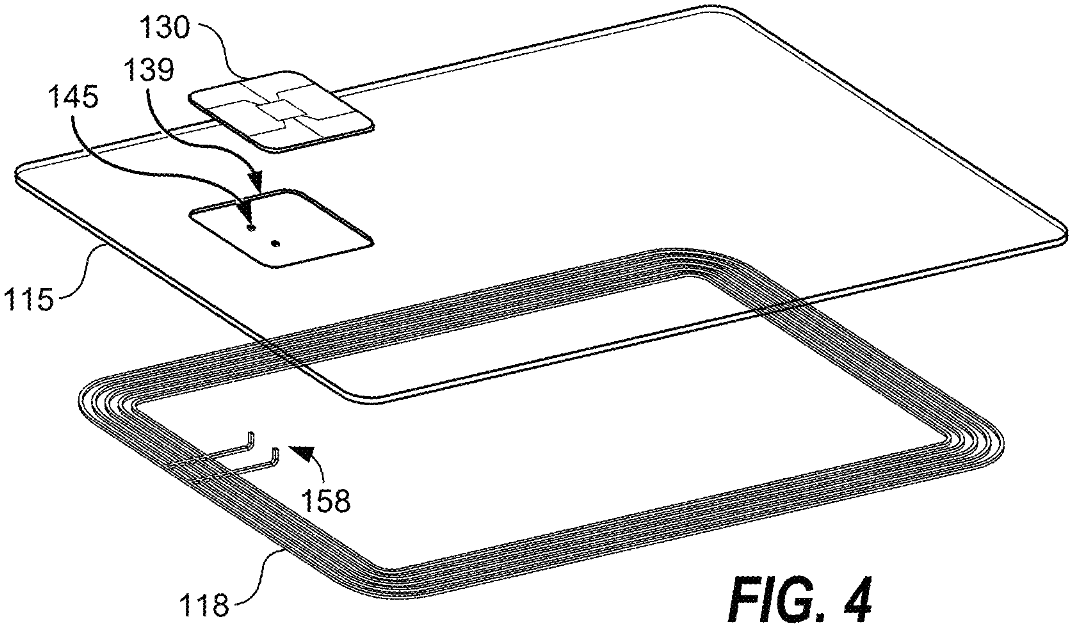
FIG. 4 depicts an exploded view of one example arrangement of a portion of the transaction card.

FIG. 4 depicts a partial exploded view of another example arrangement of the transaction card 100. In FIG. 4, the processing chip 130 is shown as being placed within a pocket 139 on an exterior surface of the antenna inlay layer 115 or other suitable layer. The processing chip 130 can be secured within the pocket 139 using any suitable adhesive. The bottom of the pocket 139 of the antenna inlay layer 115 can have a plurality of holes 145. The loop antenna 120, although shown separate from the antenna inlay layer 115, can be embedded within the antenna inlay layer 115, or can be positioned on a respective side of the antenna inlay layer 115. In some embodiments, the loop antenna 120 can be physically coupled to the processing chip 130 by passing wire 158 (e.g., a first wire and a second wire 158) through individual ones of the holes 145 located at the bottom of the pocket 139. For instance, the first wire and second wire 158 can be coupled to terminals of the processing chip 130.

Figure 5:
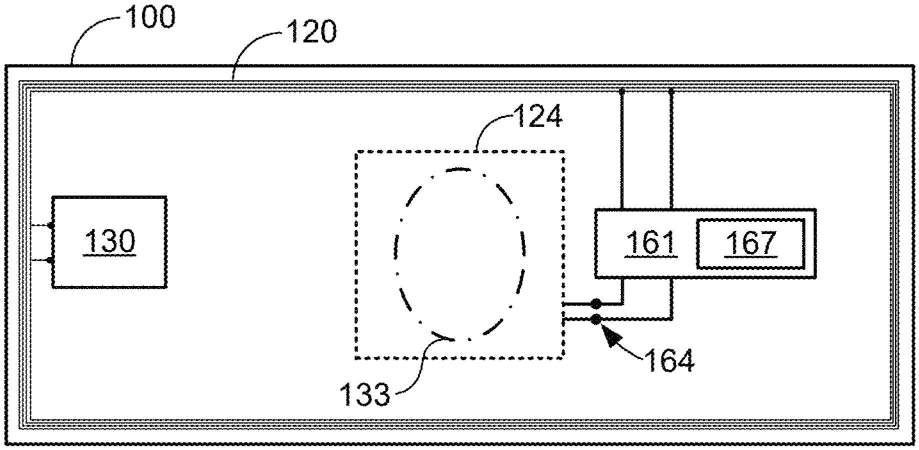
FIG. 5 depicts a schematic diagram of one example arrangement of the transaction card.

FIG. 5 depicts a schematic diagram of an example arrangement of the transaction card 100. The transaction card 100 can include wireless power receiver circuitry 161 that, in some approaches, can be coupled to the light-emitting element 124 and the loop antenna 120. The wireless power receiver circuitry 161 can be configured to receive a wireless signal via the loop antenna 120 and induce a voltage across terminals 164 of the light-emitting element 124, thereby causing the light-emitting element 124 to illuminate and emit light through the transparent portion 133. The wireless signal, for example, can be received when the transaction card 100 is placed with an oscillating magnetic field.

In some approaches, the wireless power receiver circuitry 161 includes a bridge rectifier 167 that converts an alternating circuit (AC) signal received from the loop antenna 120 to a direct current (DC) signal. As such, the wireless power receiver circuitry 161 can transmit the DC signal to the terminals 164 of the light-emitting element 124 which, in other words, induces an electric potential (i.e., a voltage) across the terminals 164 of the light-emitting element 124. In various embodiments, the transaction card 100 is capable of lighting up light-emitting elements of 1 $m^2$ to 4 $m^2$, such as 1 $m^2$, 1.5 $m^2$, 2.0 $m^2$, 2.5 $m^2$, 3.0 $m^2$, 3.5 $m^2$, and 4.0 $m^2$.

The example of FIG. 5 shows the light-emitting element 124 having a size that is greater than the transparent portion 133, as well as having a square or rectangular shape. For instance, the light-emitting element 124 can include an OLED panel disposed behind a layer having the transparent portion 133 such that light emits through the transparent portion 133 when the transaction card 100 receives a sufficient wireless signal. While the light-emitting element 124 is square shaped, due to the transparent portion 133 being ovular shaped, it is understood that the illuminating region on the transaction card 100 will be ovular as other portions of the transaction card 100 outside of the transparent portion 133 are opaque. While FIG. 5 shows the light-emitting element 124 being aligned with the transparent portion 133, in some approaches, the light-emitting element 124 (e.g., an OLED panel) can be offset at a predetermined (e.g., 45 degrees).

However, in some approaches, the light-emitting element 124 can be smaller than the transparent portion 133. For instance, in approaches in which the light-emitting element 124 is a single LED, the single LED can be positioned in a top right or top left area of the transparent portion 133, or in another suitable location. In any event, the transaction card 100 can have an illuminating central region or other region, card numbers, expiration date, "member since" banner, card owner name, border region surrounding the processing chip 130, and so forth.

Figure 6:
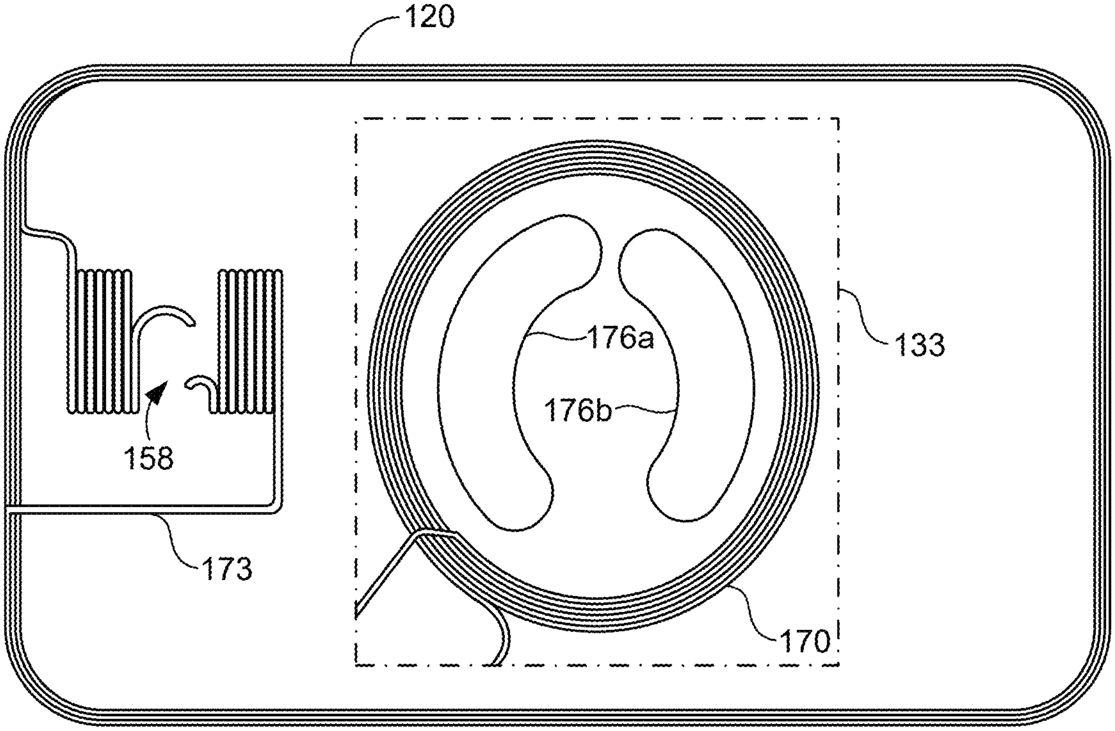
FIG. 6 depicts one example arrangement of antennae and a light-emitting element of the transaction card.

FIG. 6 depicts an example of the antennae of the transaction card 100 shown relative to a light-emitting element 124. The antenna of the transaction card 100 can include the loop antenna 120 described above, as well as an inductive illumination antenna 170 and a processing chip antenna 173 among other antennae. The processing chip antenna 173 can be coupled to the processing chip 130. The approach shown in FIG. 6 includes wire 158 that can be physically or directly coupled to the processing chip 130. However, in other approaches, the processing chip 130 can be powered via inductive coupling.

The inductive illumination antenna 170 can power the light-emitting element 124 causing the light-emitting element 124 to illuminate. To this end, in some approaches, the loop antenna 120 can be used to power the processing chip 130, whereas the inductive illumination antenna 170 can be used to power the light-emitting element 124. Other combinations of antennas and powered elements can be employed. As noted above, the light-emitting element 124 can include a multitude of light-emitting elements 124. In some approaches, the light-emitting elements 124 of the transaction card 100 can provide a first light-emitting region 176*a* and a second light-emitting region 176*b* (collectively "light-emitting regions 176") formed up of a plurality of micro light-emitting diodes (microLEDs).

In some approaches, the light-emitting regions 176 can be formed on a substrate by printing a predetermined shape using a diode ink. The diode ink can include a liquid or gel suspension having a dispersion of LEDs therein capable of being printed. Printing the microLEDs on a substrate (e.g., a layer of the transaction card 100) can include screen printing, for example. A density of LEDs in the light-emitting regions 176 can be determined based on a concentration of the LEDs in the ink composition prior to being printed as well as an average number of LEDs resulting within the printed area when dried.

The LEDs in the suspension can include semiconductor devices that illuminate when powered. As such, in some embodiments, the light-emitting regions 176 can be powered by the inductive illumination antenna 170. The LEDs in the light-emitting regions 176 can be positioned between two conductor layers, where at least one of the conductor layers can be transparent such that light is visibly emitted through the transparent conductor layer. The LEDs are printed to form the light-emitting regions 176 and are connected to one another in parallel. The LEDs in the light-emitting regions 176 can be energized by inducing a predetermined voltage across the conductor layers. As such, the inductive illumination antenna 170 can include conductive metal or other material forming a loop that induces a current and an oscillating magnetic field to illuminate the microLEDs in the light-emitting regions 176 such that a portion of the transaction card 100 illuminates.

Although shown using a coil that induces an oscillating magnetic field, in other approaches, wires can be coupled to the conductor layers to induce a suitable voltage. In some approaches, the inductive illumination antenna 170 is coupled to or integral with the loop antenna 120 and/or the processing chip antenna 173. The light-emitting regions 176 can be positioned behind, proximate, or otherwise relative to the transparent portion 133 of the transaction card 100. As such, the LEDs illuminate when a suitable voltage is applied to conductor layers of the light-emitting regions 176.

Figure 7:
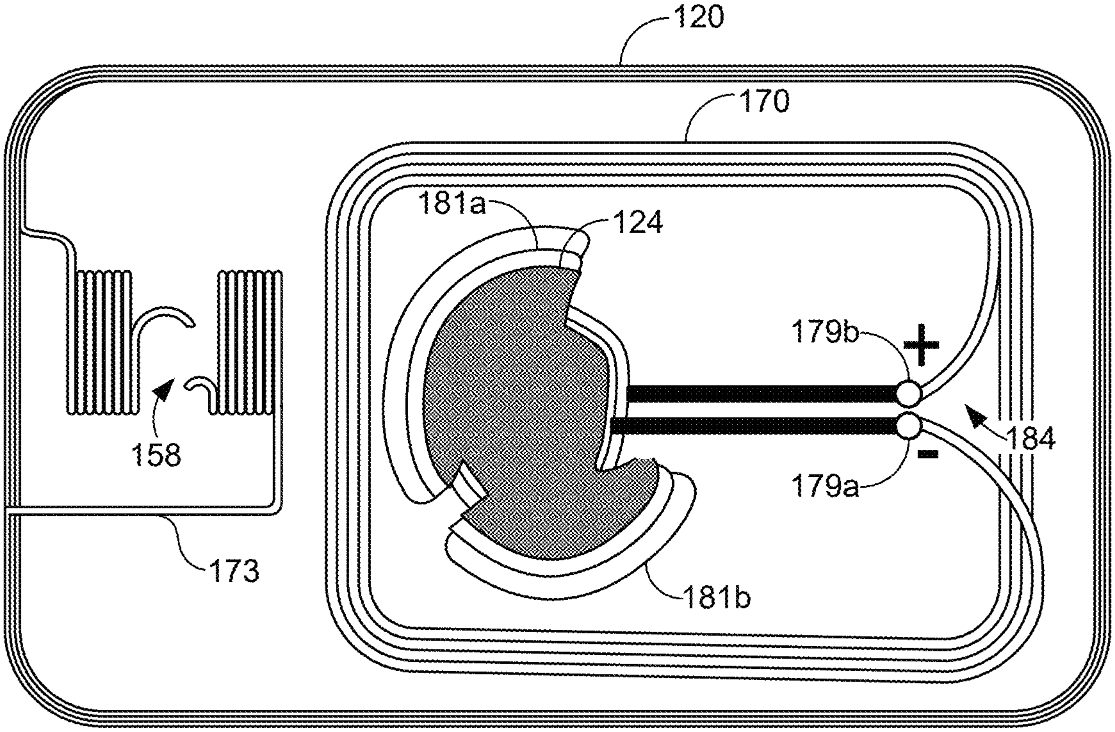
FIG. 7 depicts a front view of one example arrangement of antennae and a light-emitting element of the transaction card.
Figure 8:
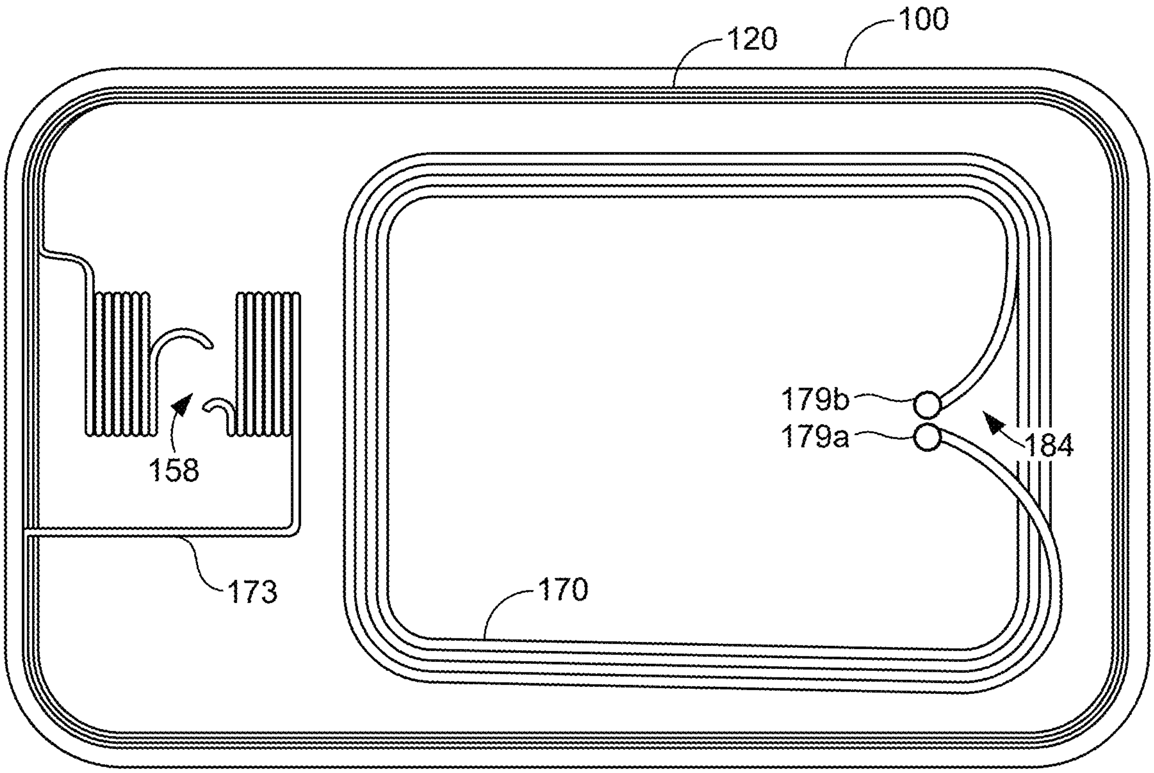
FIG. 8 depicts a rear view of one example arrangement of antennae and a light-emitting element of the transaction card.

Turning now to FIGS. 7 and 8, FIG. 7 depicts a front view of the transaction card 100 and FIG. 8 depicts a rear view of the transaction card 100. The light-emitting element 124 of the transaction card 100 can include terminals 179 in some approaches. For instance, the terminals 179 can include a negative terminal 179*a* and a positive terminal 179*b*. While the approach shown in FIG. 6 uses inductive coupling, the approach shown in FIGS. 7 and 8 shows the inductive illumination antenna 170 being physically or directly coupled to the light-emitting element 124. When the transaction card 100 is positioned in an oscillating magnetic field, the loop antenna 120 induces current in the inductive illumination antenna 170. When current is inducted in the inductive illumination antenna 170, a voltage is applied across the terminals 179 of the light-emitting element 124.

In some approaches, the light-emitting element 124 includes microLEDs positioned between a first conductive layer 181*a* and a second conductive layer 181*b*. The first terminal 179*a* is coupled to the first conductive layer 181*a* and the second terminal 179*b* is coupled to the second conductive layer 181*b*, inducing a voltage in the microLEDs. Wires 184 of the inductive illumination antenna 170 can be coupled directly to the respective terminals 179.

Figure 9:
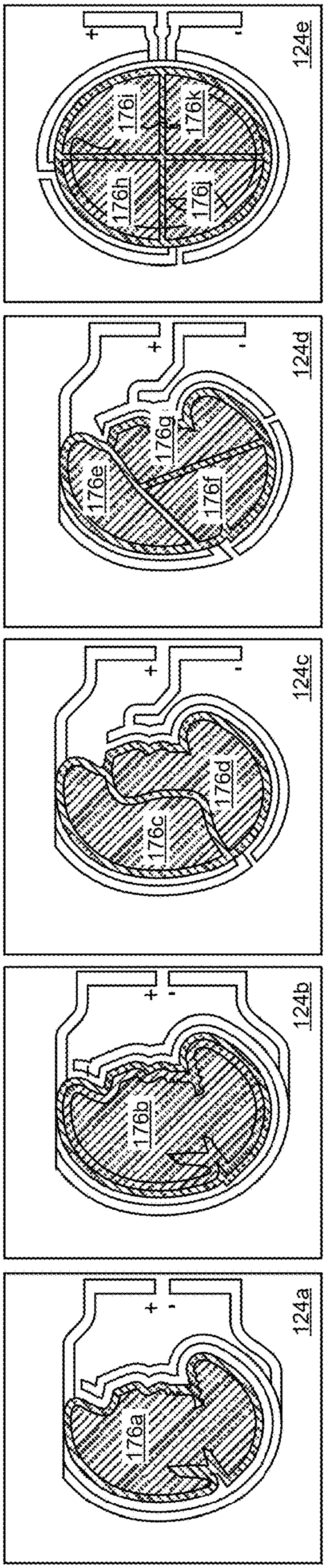
FIG. 9 depicts various approaches for forming a light-emitting element of the transaction card.

FIG. 9 depicts various alternative approaches for forming a light-emitting element 124. First, a first light-emitting element 124*a* is shown formed up of a single light-emitting region 176*a* having a size and dimensions the same as a transparent portion 133 of the transaction card 100. For instance, the transparent portion 133 can have a shape the same as the light-emitting region 176*a*. Second, a second light-emitting element 124*b* is shown formed up of a single light-emitting region 176*b*, referred to as an oversized light-emitting region 176 as the light-emitting region can have a size and dimensions slightly greater than the transparent portion 133 of the transaction card 100, providing an enhanced illumination effect.

A third light-emitting element 124*c* includes two light-emitting regions 176*c*, 176*d*, a fourth light-emitting element 124*d* includes three light-emitting regions 176*e* . . . 176*g*, a fifth light-emitting element 124*e* includes four light-emitting regions 176*h* . . . 176*k*, and so forth. It is understood that the transaction card 100 can include other number of light-emitting elements 124 and light-emitting regions 176, as can be appreciated. Additionally, the light-emitting elements 124 can be located in various alternative arrangements than those depicted in FIG. 9. The light-emitting regions 176 of the light-emitting element 124 can be formed by printing diode ink onto a layer of the transaction card 100 in accordance with the approaches shown in FIG. 9.

Figure 10:
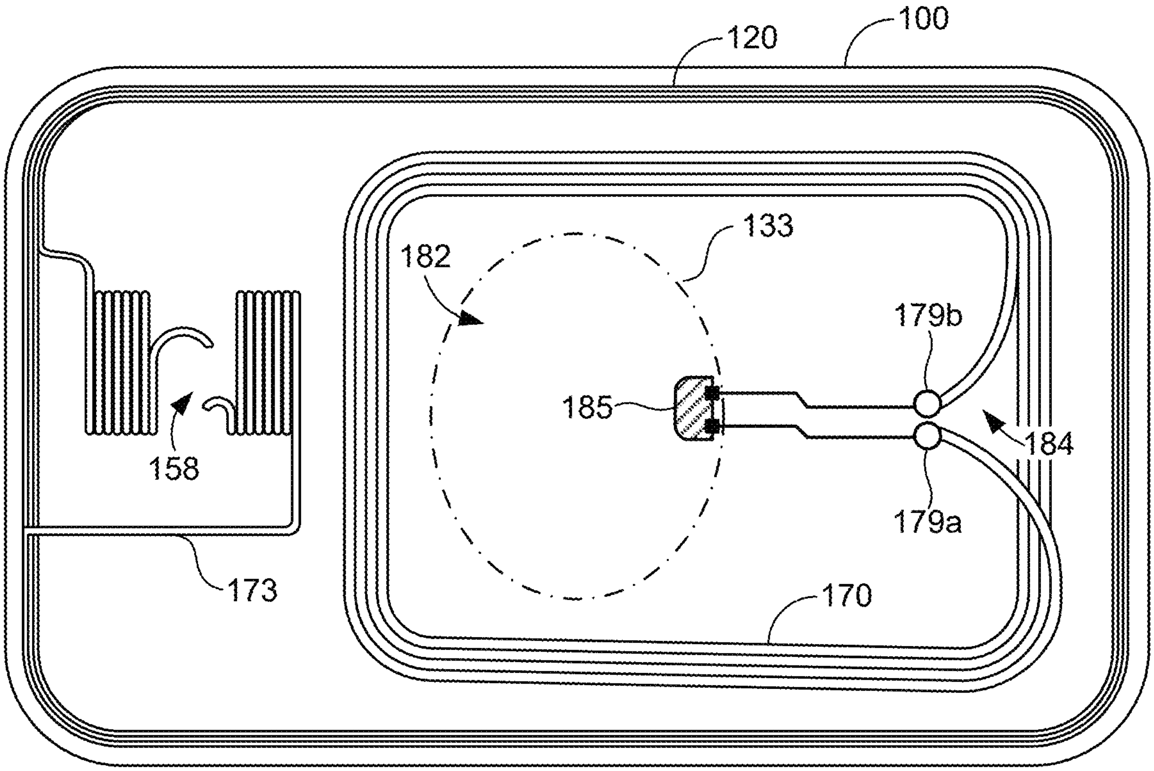
FIG. 10 depicts one example arrangement of antennae and a light-emitting element of the transaction card.
Figure 11:
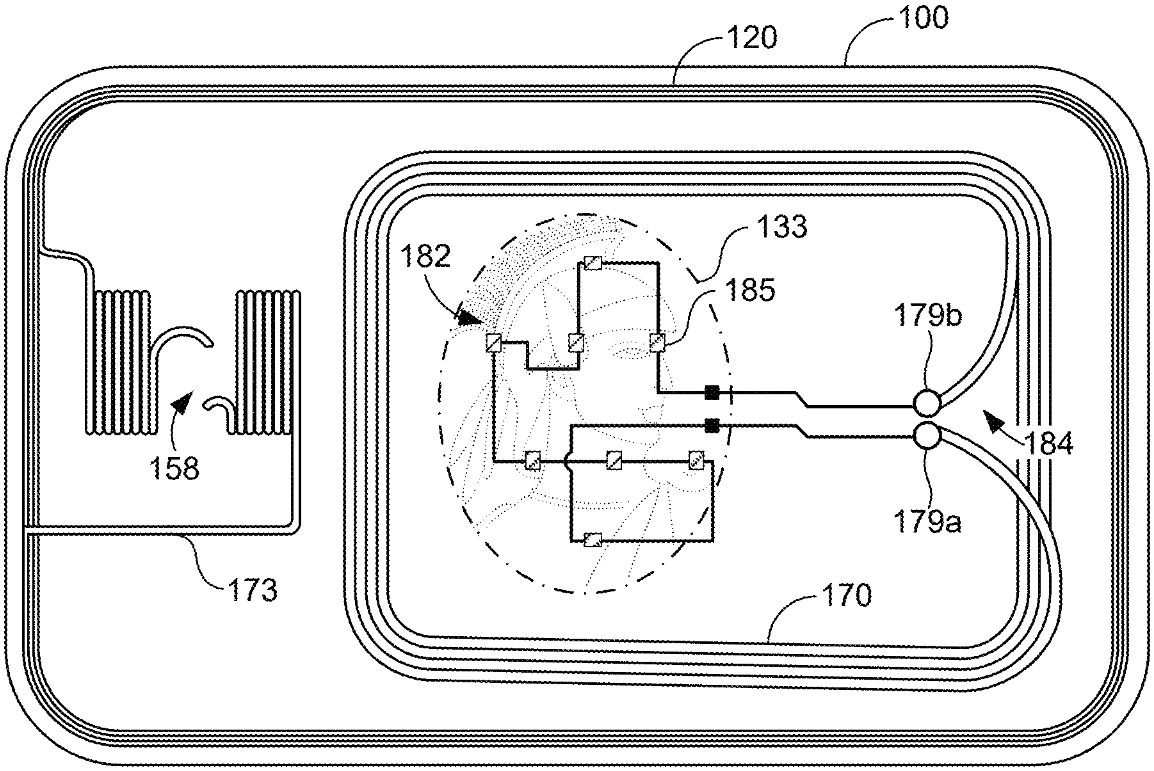
FIG. 11 depicts one example arrangement of antennae and light-emitting elements of the transaction card.
Figure 12:
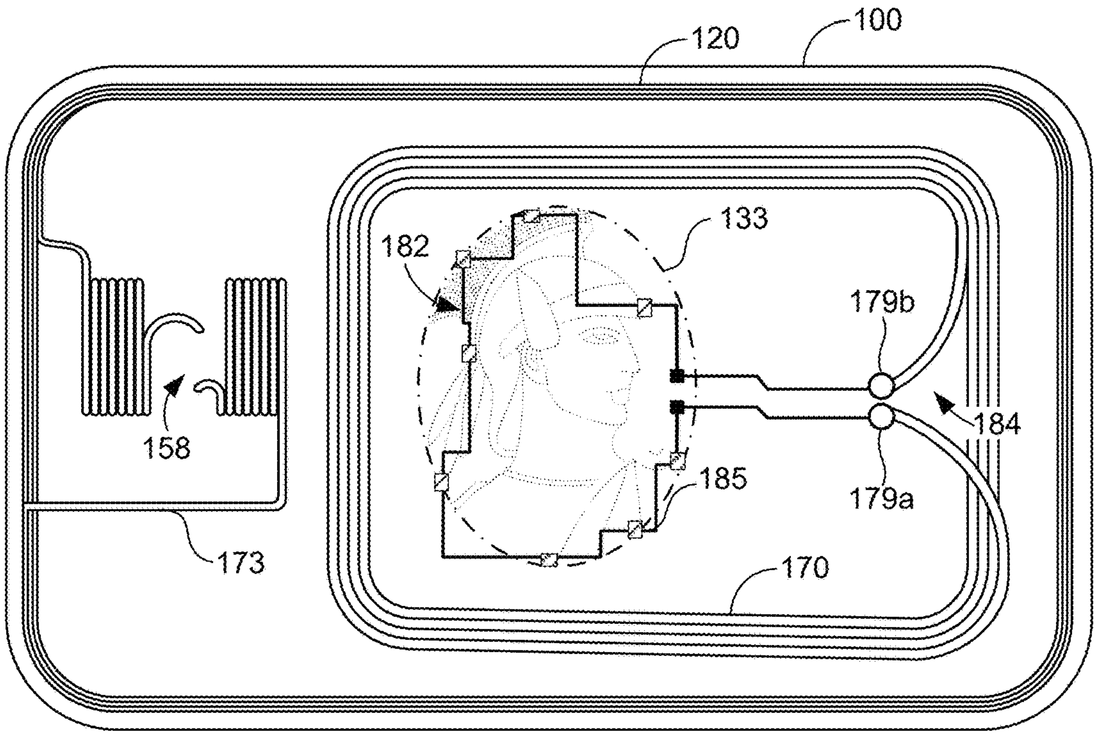
FIG. 12 depicts one example arrangement of antennae and light-emitting elements of the transaction card.

Moving along to FIGS. 10, 11, and 12, FIGS. 10, 11, and 12 depict other example arrangements of the transaction card 100. Specifically, FIG. 10 shows the transaction card 100 having a light-emitting element circuit 182 with a single light-emitting diode 185, whereas FIG. 11 shows the transaction card 100 having a light-emitting element circuit 182 a multitude of light-emitting diodes 185. The light-emitting element circuits 182 of FIGS. 10 and 11 can have a two-dimensional form factor and can be formed integral with the antenna inlay layer 115 (or other suitable layer). For example, the light-emitting element circuits 182 of FIGS. 10 and 11 can be etched into the antenna inlay layer 115 without adding notable thickness to the respective layer.

Referring specifically to FIG. 11, an arrangement of light-emitting diodes 185 is shown for illuminating the ovular-shaped transparent portion 133. For instance, a first row of the light-emitting diodes 185 has a single light-emitting diode 185, a second row of the light-emitting diodes 185 has three light-emitting diodes 185, a third row of the light-emitting diodes 185 has three light-emitting diodes 185, and a fourth row of the light-emitting diodes 185 has a single light-emitting diode 185. The light-emitting diodes 185 of the second row and the third row can be in aligned or offset, where the offset arrangement is shown in FIG. 11. Similarly, the light-emitting diodes 185 in the first row and the fourth row can be offset or aligned, where the aligned arrangement is shown in FIG. 11. It is understood that other arrangements of light-emitting diodes 185 can be employed depending on the shape of the transparent portion 133 or, in other words, the shape of the region to be illuminated.

Referring specifically to FIG. 12, an arrangement of light-emitting diodes 185 is shown for illuminating a centurion-shaped transparent portion 133. In other words, light-emitting diodes 185 are distributed across a border or a periphery of a predetermined shape (e.g., a centurion-shape). As such, it is understood that other arrangements of light-emitting diodes 185 can be employed depending on the shape of the transparent portion 133 or, in other words, the shape of the region to be illuminated. In other embodiments, an LED band or other collection of light-emitting diodes 185 can be distributed along a border or a shape to be illuminated. In some embodiments, a number of the light-emitting diodes 185 can be eight, which provides suitable illumination while having sufficient power provided via the inductive illumination antenna 170 and/or the loop antenna 120.

Figure 13:
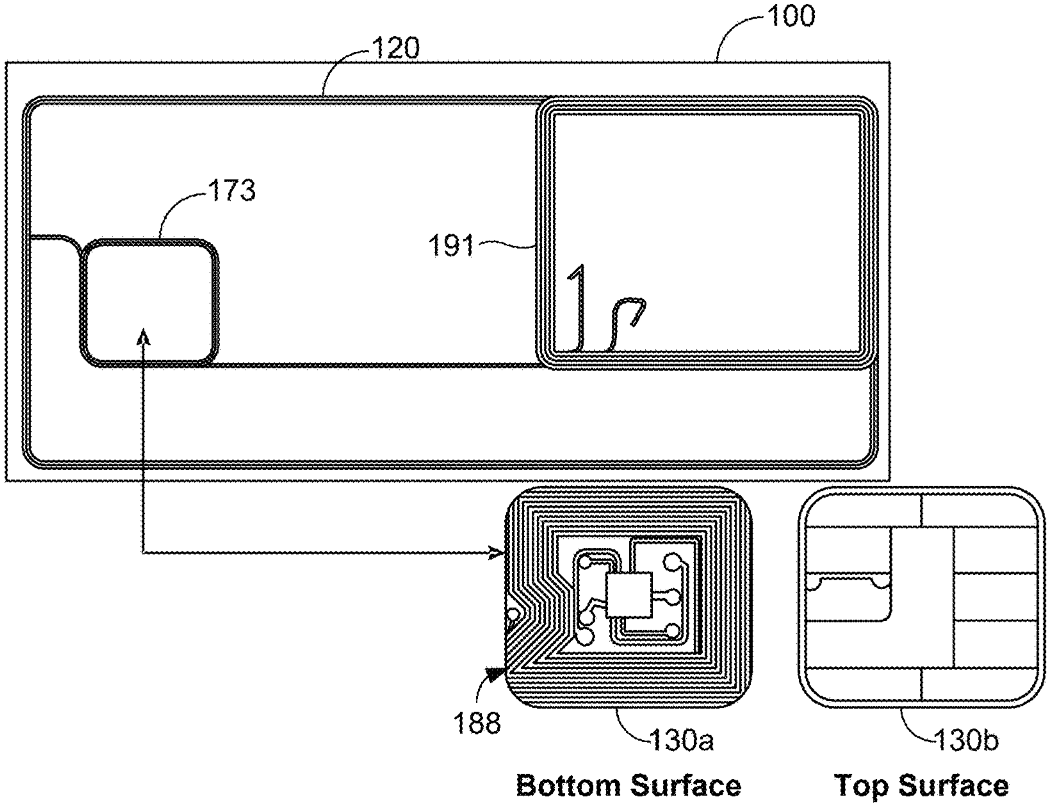
FIG. 13 depicts one example arrangement of antennae and a processing chip of the transaction card.

FIG. 13 shows another example arrangement of the transaction card 100. A bottom surface and a top surface of the processing chip 130 are shown for illustration purposes. In the approach shown in FIG. 13, the antennae of the transaction card 100 include the loop antenna 120 and the processing chip antenna 173. The processing chip antenna 173 inductively couples to an inductive antenna 188 positioned and/or exposed on the bottom surface of the processing chip 130*a*, 130*b*. The antenna can further include a distal antenna loop 191 positioned on a distal end of the transaction card 100 opposite that of the processing chip 130 that further facilitates receipt of a wireless signal in an oscillating magnetic field generated by a reader device 106.

Figure 14:
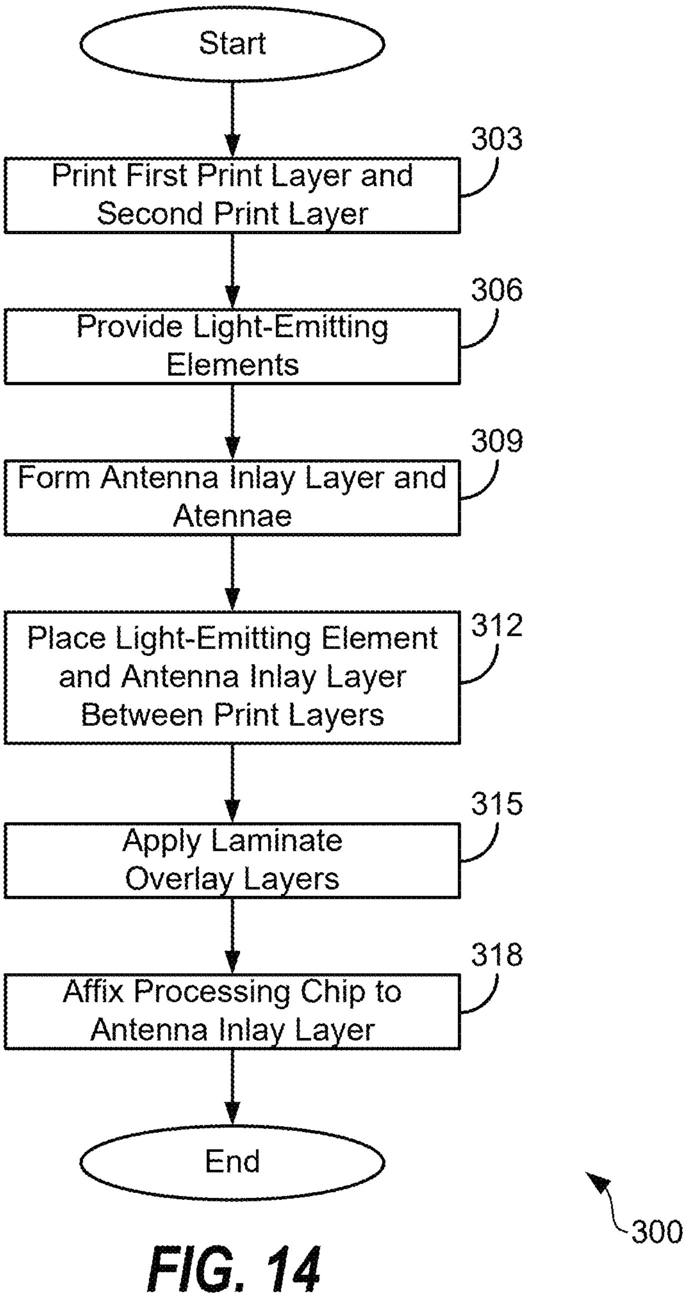
FIG. 14 is a flowchart that provides an example of the process for manufacturing a transaction card according to various embodiments of the present disclosure.

Referring next to FIG. 14, a flowchart 300 is shown that provides an example of the process for manufacturing a transaction card 100 according to various embodiments of the present disclosure. Although the flowchart of FIG. 14 shows an example sequence of actions, it is understood that the order of actions can differ from that which is depicted. For example, the actions depicted by two or more boxes shown in succession can be performed concurrently or with partial concurrence. As another example, the actions depicted by two or more boxes can be performed in alternative sequences compared to what is depicted. Further, in some embodiments, one or more of the boxes shown in the flowchart of FIG. 14 can be skipped or omitted. It is understood that all such variations are within the scope of the present disclosure.

Beginning at box 303, the first print layer 109 and the second print layer 112 can be printed. The first print layer 109 and the second print layer 112 can be printed such that one of the first print layer 109 and the second print layer 112 includes a transparent portion 133. Transparent portion 133 can include an area in which no ink has been printed or an area in which ink has been thinly or otherwise applied such that light is able to transmit through the transparent portion 133. It is understood that portions of the first print layer 109 and/or the second print layer 112 that are not transparent are opaque and block the transmission of light.

Next, at box 306, the light-emitting element 124 of the transaction card 100 can be formed or provided. The light-emitting element 124 as formed or provided can have a two-dimensional form factor where the light-emitting element 124 does not considerably increase the thickness of the transaction card 100 as assembled to no longer comply with ISO standards. In some approaches, the light-emitting elements 124 can be provided by being printed on a substrate, such as the antenna inlay layer 115 or other layer, to be positioned between the first print layer 109 and the second print layer 112. The printing of the light-emitting elements 124 can include use of a diode ink that include a liquid or gel suspension having LEDs dispersed therein. Printing the microLEDs on the substrate can include screen printing, for example. The printing of the light-emitting element 124 can be performed to achieve a predetermined and desirable concentration of LEDs, where the concentration of LEDs can be determined as a function of the density of the LEDs in the ink composition prior to being printed.

In some approaches, providing the light-emitting element 124 can include forming a substrate having a light-emitting element circuit 182 with one or more light-emitting diodes 185 therein that is integral with the substrate (e.g., the antenna inlay layer 115). The arrangement of the light-emitting diodes 185 can be determined based on a shape and size of the transparent portion 133 and/or the region of the transaction card 100 to be illuminated.

In some approaches, forming the light-emitting element 124 can include forming or otherwise providing an OLED panel and disposing the OLED panel on a substrate. In some approaches, the OLED panel is formed integral with the substrate while, in other approaches, the OLED panel is distinct and separate from the substrate. The substrate described for any of the foregoing approaches can be the antenna inlay layer 115 or other suitable layer to be positioned between the first print layer 109 and the second print layer 112.

Thereafter, in box 309, the antenna inlay layer 115 and the antennae thereon can be formed, for instance, by forming the loop antenna 120, the processing chip antenna 173, the distal antenna loop 191, other desired antenna, and/or a combination thereof. The antennae can be formed by disposing copper or other conductive material into the arrangements shown in the preceding figures, thereby forming antennae with a two-dimensional form factor. In some approaches, box 309 is performed prior to box 306.

In box 312, the light-emitting element 124 and the antenna inlay layer 115 can be placed between the first print layer 109 and the second print layer 112. It is understood that the transparent portion 133 on at least one of the first print layer 109 and the second print layer 112 can be aligned with the light-emitting element 124 or can be otherwise positioned relative to the light-emitting element 124 such that light emitted by the light-emitting element 124 emits through the transparent portion 133.

In some examples, a binding medium can be employed that is deposited using any number of approaches. For example, a glue or similar adhesive could be sprayed on each or selective ones of the layers. As another example, an adhesive sheet could be laid between the first print layer 109 and the antenna inlay layer 115 and/or between the second print layer 112 and the antenna inlay layer 115.

In box 315, a first laminate overlay layer 118 can be applied to an outermost side (or, in other words, a top side) of the first print layer 109 and a second laminate overlay layer 121 can be applied to an outermost side (or, in other words, a bottom side) of the second print layer 112. In some approaches, prior to doing so, a magnetic stripe 136 can be placed on top of the second laminate overlay layer 121 of the transaction card 100.

In some implementations, the magnetic stripe 131 can be affixed to the second laminate overlay layer 121 using an adhesive. In other implementations, the magnetic stripe 136 can have an adhesive backing, causing the magnetic stripe 136 to self-adhere when placed in contact with the second laminate overlay layer 121. In some implementations, the placement of the magnetic stripe 136 could be omitted (e.g., for embodiments of a transaction card 100 that are not manufactured to include the magnetic stripe 136).

Then, at box 318, a processing chip 130 can be affixed to the antenna inlay layer 115. For example, an adhesive could be deposited in the pocket 139 of the antenna inlay layer 115. The processing chip 130 could then be placed in the pocket 139. The adhesive in the pocket 139 could then cause the processing chip 130 to become affixed to the antenna inlay layer 115. Thereafter, the process can proceed to completion.

Figure 15:
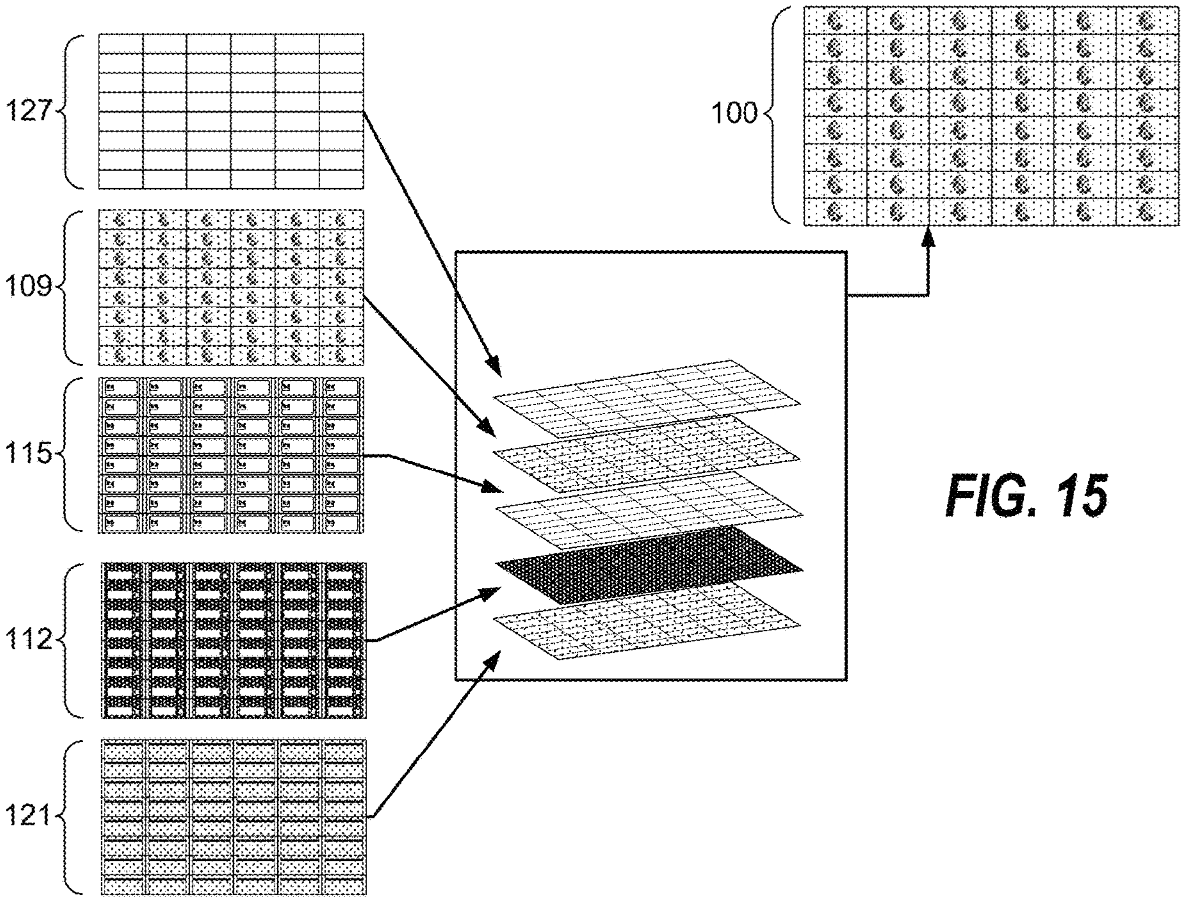
FIG. 15 depict examples of a sheets used in the manufacturing process described by the flowchart of FIG. 13.

FIG. 15 depicts an example of various sheets used in the manufacturing process described by the flowchart of FIG. 14. As shown, a first sheet can include multiple ones of the first print layer 109, the second print layer 112, the antenna inlay layer 115, the post-laminate varnish layer 127 (e.g., a front laminate), the second laminate overlay layer 121 (e.g., a rear laminate and magnetic stripe 136), and so forth. In other words, the sheets can be formed to provide multiple ones of the layers prior to being cut and assembled.

After the sheets for the respective layers are formed, the sheets are collated, alignment of the sheets is registered, and the sheets are tacked together. Notably, alignment of the sheets can be important due to the antennae of the antenna inlay layer 115 being milled, providing tight tolerances of 0.5 mm or less. Once the various layers are stacked together, the layers can be spot welded together for lamination.

The features, structures, or characteristics described above can be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure can be practiced without one or more of the specific details, or other methods, components, materials, and the like can be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include,"

"have," "contain," and their variants are used to be open ended, and are meant to include additional elements, components, etc., in addition to the listed elements, components, etc. unless otherwise specified in the appended claims. If a component is described as having "one or more" of the component, it is understood that the component can be referred to as "at least one" component.

The terms "first," "second," etc. are used only as descriptive labels, rather than a limitation for a number of the objects. It is understood that if multiple components are shown, the components can be referred to as a "first" component, a "second" component, and so forth, to the extent applicable.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A transaction card manufactured by a process comprising:

forming a plurality of layers comprising:

a first print layer having one or more transparent portions; and an inlay layer comprising one or more antenna;

positioning one or more light-emitting elements between the first print layer and the inlay layer and positioned proximate to individual ones of the one or more transparent portions of the first print layer;

coupling the plurality of layers to form a sheet; and separating the sheet to form one or more transaction cards.

2. The transaction card manufactured by the process of claim 1, wherein the plurality of layers further comprises a second print layer, further comprising positioning the inlay layer between the first print layer and the second print layer.

3. The transaction card manufactured by the process of claim 2, wherein the plurality of layers further comprises:

a first overlay layer, the first overly layer being transparent;

a second overlay layer, the second overlay layer being transparent; and wherein the first print layer is positioned between the first overlay layer and the inlay layer and the second print layer is positioned between the second overlay layer and the inlay layer.

4. The transaction card manufactured by the process of claim 3, wherein the second overlay layer comprises a magnetic stripe capable of storing data.

5. The transaction card manufactured by the process of claim 2, wherein the inlay layer is transparent, the one or more transparent portions are first transparent portions, the second print layer comprises one or more second transparent portions, and individual ones of the one or more second transparent portions of the second print layer are proximate to the one or more light-emitting elements.

6. The transaction card manufactured by the process of claim 1, wherein individual ones of the one or more light-emitting elements comprise a first conductor layer, a second conductor layer, and one or more light-emitting diodes (LEDs), such that the LEDs are positioned between the first conductor layer and the second conductor layer, and the first conductor layer is transparent.

7. The transaction card manufacturer by the process of claim 6, wherein the LEDs illuminate when a voltage is applied to at least the first conductor layer.

8. The transaction card manufacturer by the process of claim 1, further comprising laminating the sheet.

9. A method, comprising:

forming a first print layer having a transparent portion;

forming an inlay layer comprising an antenna; and placing a light-emitting element between the first print layer and the inlay layer, the light-emitting element being positioned proximate to the transparent portion of the first print layer.

10. The method of claim 9, further comprising:

forming a second print layer; and positioning the inlay layer between the first print layer and the second print layer.

11. The method of claim 9, wherein the light-emitting element has a first terminal and a second terminal.

12. The method of claim 11, wherein the antenna of the inlay layer has a first inductive end connected to the first terminal and a second end connected to the second terminal.

13. The method of claim 12, further comprising inducing a voltage across at least one of the first terminal or the second terminal of the light-emitting element that cause the light-emitting element to illuminate.

14. The method of claim 9, wherein the light-emitting element comprises a light-emitting region, the light-emitting region being formed on a substrate by printing a predetermined shape using a diode ink.

15. A transaction card manufactured by a process comprising:

forming a plurality of layers comprising a first print layer having one or more first layer transparent portions;

a second print layer having one or more second layer transparent portions; and an inlay layer comprising one or more antenna;

positioning one or more first light-emitting elements between the first print layer and the inlay layer, the one or more first light-emitting elements being positioned proximate to individual ones of the one or more first layer transparent portions of the first print layer;

positioning one or more second light-emitting elements between the second print layer and the inlay layer, the one or more second light-emitting elements being positioned proximate to individual ones of the one or more second layer transparent portions of the second print layer; and coupling the plurality of layers to form a sheet; and separating the sheet to form one or more transaction cards.

16. The transaction card manufactured by the process of claim 15, wherein the plurality of layers further comprises:

a first overlay layer, the first overly layer being transparent;

a second overlay layer, the second overlay layer being transparent; and wherein the first print layer is positioned between the first overlay layer and the inlay layer and the second print layer is positioned between the second overlay layer and the inlay layer.

17. The transaction card manufactured by the process of claim 16, wherein the second overlay layer comprises a magnetic stripe capable of storing data.

18. The transaction card manufactured by the process of claim 15, wherein individual ones of the one or more first light-emitting elements and individual ones of the second light-emitting elements comprise a first conductor layer, a second conductor layer, and one or more light-emitting diodes (LEDs), such that the LEDs are positioned between the first conductor layer and the second conductor layer, and the first conductor layer is transparent.

19. The transaction card manufacturer by the process of claim 18, wherein the LEDs illuminate when a voltage is applied to at least the first conductor layer.

20. The transaction card manufacturer by the process of claim 15, further comprising laminating the sheet.

* * * * *